(12) United States Patent
Drozd et al.

(10) Patent No.: US 12,147,441 B2
(45) Date of Patent: *Nov. 19, 2024

(54) METHOD AND SYSTEM FOR PROVIDING RECOMMENDATIONS AND SEARCH RESULTS TO VISITORS WITH A FOCUS ON LOCAL BUSINESSES

(71) Applicant: BlueOwl, LLC, San Francisco, CA (US)

(72) Inventors: Kayla Drozd, Portland, OR (US); Theobolt N. Leung, San Francisco, CA (US); Kenneth J. Sanchez, San Francisco, CA (US)

(73) Assignee: QUANATA, LLC, San Francisco, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 17/747,189

(22) Filed: May 18, 2022

(65) Prior Publication Data

US 2022/0277002 A1 Sep. 1, 2022

Related U.S. Application Data

(63) Continuation of application No. 16/574,667, filed on Sep. 18, 2019, now Pat. No. 11,372,876.

(51) Int. Cl.
*G06F 16/248* (2019.01)
*G06F 16/2457* (2019.01)
*G06F 16/29* (2019.01)

(52) U.S. Cl.
CPC ...... *G06F 16/248* (2019.01); *G06F 16/24578* (2019.01); *G06F 16/29* (2019.01)

(58) Field of Classification Search
CPC ... G06F 16/248; G06F 16/24578; G06F 16/29
See application file for complete search history.

(56) References Cited

U.S. PATENT DOCUMENTS

| | | |
|---|---|---|
| 8,620,579 B1 | 12/2013 | Upstill et al. |
| 9,057,616 B1 | 6/2015 | Lopatenko et al. |

(Continued)

OTHER PUBLICATIONS

Yang, "POI Information Enhancement Using Crowdsourcing Vehicle Trace Data and Social Media Data: A Case Study of Gas Station," 2018, ISPRS International Journal of Geo-Information, 7(5), p. 178 (Year: 2018).

(Continued)

*Primary Examiner* — Truong V Vo
(74) *Attorney, Agent, or Firm* — BRYAN CAVE LEIGHTON PAISNER LLP

(57) ABSTRACT

A method and system is provided for providing local business-based recommendations or search results to visitors. In response to a request for a digital map of a geographic area, the system determines whether a user is familiar with the geographic area based on the user's location history. In response to determining that the user is unfamiliar with the geographic area and therefore is a visitor of the geographic area, the system provides recommendations, suggestions, or search results to the user which includes local businesses which are of interest to the user. The local businesses may include local businesses which are related to a geographic search query provided by the user, or may include local businesses recommended by the system according to the time of day, time of year, events within the geographic area such as events stored in the user's virtual calendar, reviews of the local businesses, etc.

20 Claims, 8 Drawing Sheets

(56) References Cited

U.S. PATENT DOCUMENTS

| | | |
|---|---|---|
| 2003/0177058 A1 | 9/2003 | Needham |
| 2006/0240798 A1* | 10/2006 | Jarosinski ......... H04W 52/0225 |
| | | 455/343.1 |
| 2008/0051994 A1 | 2/2008 | Fisher et al. |
| 2011/0099046 A1 | 4/2011 | Weiss et al. |
| 2014/0129080 A1 | 5/2014 | Leibowitz et al. |
| 2015/0204688 A1 | 7/2015 | Gearhart et al. |
| 2015/0278211 A1 | 10/2015 | Voronel |
| 2015/0348117 A1 | 12/2015 | Busch |
| 2016/0189186 A1 | 6/2016 | Fabrikant et al. |
| 2016/0247175 A1 | 8/2016 | Milton et al. |
| 2018/0253784 A1 | 9/2018 | Tapley et al. |

OTHER PUBLICATIONS

Yuan, "Time-aware Point-of-Interest Recommendation," 2013, In Proceedings of the 36th international ACM SIGIR conference on Research and development in information retrieval, pp. 363-372 (Year: 2013).

\* cited by examiner

300

| Business ID 302 | Name 304 | Location 306 | Size 308 | Business Type 310 |
|---|---|---|---|---|
| 1 | Famous Dave's Bar-B-Que | 1603 Morrissey Dr, Bloomington, IL 61704 | National | Restaurant |
| 2 | Steak 'n Shake | 1802 S Veterans Pkwy, Bloomington, IL 61704 | National | Restaurant |
| 3 | Keller's Iron Skillet and Catering | 609 Hannah St, Bloomington, IL 61701 | Local | Restaurant |
| 4 | Ozark House Restaurant | 704 McGregor St, Bloomington, IL 61701 | Local | Restaurant |

| | SUNDAY | MONDAY | TUESDAY | WEDNESDAY | THURSDAY | FRIDAY | SATURDAY |
|---|---|---|---|---|---|---|---|
| | Jul 1 | 2 | 3 | 4 | 5 | 6 | 7 |
| | 8 | 9 | 10 | 11 | Hiking<br>Holiday Park<br>10 am — 504a | 13 | 14 |
| | 15 | Concert<br>Joe's Theater<br>8 pm — 504c | 17 | 18 | 19 | 20 | 21 |
| | 22 | 23 | 24 | 25 | Tony's Diner<br>6 pm — 504b | 27 | 28 |
| | 29 | 30 | 31 | Aug1 | 2 | 3 | 4 |

Calender x — 502

Search Calender (Control + E)

500

METHOD AND SYSTEM FOR PROVIDING RECOMMENDATIONS AND SEARCH RESULTS TO VISITORS WITH A FOCUS ON LOCAL BUSINESSES

This application is a continuation of U.S. patent application Ser. No. 16/574,667, filed Sep. 18, 2019, incorporated by reference herein for all purposes.

TECHNICAL FIELD

The present disclosure generally relates to providing recommendations and search results to a user visiting a geographic area and, more particularly to highlighting local businesses over national or global businesses on a map display.

BACKGROUND

Today, many users request map and navigation data for various geographic locations. Software applications typically generate navigation data in response to receiving input from a user, and may recommend POIs to the user. However, POIs typically may be ranked according to popularity which may lead to a preference for national or global businesses over local businesses, due to their larger customer bases. Accordingly, local businesses may go unnoticed.

SUMMARY

To promote local businesses and generate awareness about the local businesses in a particular geographic area for a user unfamiliar with the area, a local business recommendation system receives a request from a client device for a digital map of a geographic area. The geographic area may include the client device user's current location or another location specified by the user. Furthermore, the geographic area may include a location of an event that the user is scheduled to attend. In any event, the local business recommendation system may obtain map data for the geographic area from a map database or by invoking a mapping application programming interface (API).

Furthermore, the local business recommendation system may determine whether the geographic area is familiar to the user. For example, the user may share location data with the local business recommendation system, and the local business recommendation system may store the user's home location, work location, and other locations to which the user frequently travels. The local business recommendation system may also store the user's location history and generate a familiarity score for a geographic area based on the number of times the user has visited the geographic area, passed by the geographic area, or has been within a threshold distance of the geographic area. The familiarity score may also be based on the number of times the user has visited locations outside the geographic area. In some implementations, the local business recommendation system may determine that the user is unfamiliar with the geographic area when the familiarity score is below a threshold score, when the user has not visited the geographic area or passed by the geographic area, or when the user has visited the geographic area or passed by the geographic area less than a threshold number of times.

In any event, when the local business recommendation system determines that the geographic area is unfamiliar to the user, the local business recommendation system may identify local businesses within the geographic area to recommend to the user which may be of interest to the user. The local business recommendation system may obtain indications of POIs within the geographic area from the map database or by invoking the mapping API. In some implementations, the local business recommendation system may obtain indications of each of the POIs in the geographic are for providing recommendations to the user. In other implementations, the local business recommendation system may receive a geographic search query from the user's client device related to the geographic area. The local business recommendation system may then obtain indications of POIs relevant to the geographic search query. For example, if the geographic search query is restaurants in Bloomington, Illinois, the local business recommendation system may obtain indications of restaurants in Bloomington, Illinois from the map database or by invoking the mapping API. In yet other implementations, the local business recommendation system may identify recommended types of businesses for the user according to a time of day, time of year, events within the geographic area such as events stored in the user's virtual calendar, businesses previously visited by the user from the user profile data, etc. The local business recommendation system may then obtain indications of POIs within the geographic area for the recommended types of businesses.

For each POI, the local business recommendation system may determine whether the POI is a local business or a national or global business, and may determine the type of business (e.g., restaurant, gas station, hotel, gym, concert hall, etc.) for the POI. The local business recommendation system may filter out the POIs which are national or global businesses, or may adjust the rankings of search results to boost the POIs which are local businesses. Then the local business recommendation system may provide indications of the local businesses to the client device for display on a digital map of the geographic area. For example, the user's client device may display pins or other indicators highlighting the local businesses on the digital map. The local business recommendation system may also provide the ranked search results to the client device for display, where local businesses are boosted in the ranked search results. In this manner, a user unfamiliar with a geographic area is not only provided with recommendations, suggestions, and search results of the national or global businesses in the area, but can also see the businesses which are local to the area. For example, many visitors would rather eat at a small restaurant which captures the flavors of the area instead of a larger chain restaurant which may be more popular nationwide but does not have any local ties to the area.

The present embodiments advantageously provide a user interface that presents recommendations and search results for a geographic area in a manner that is easily understandable, and which highlights local businesses. The present embodiments improve the user experience by emphasizing local businesses which typically go unnoticed in alternative systems.

In an embodiment, a method for providing local business-based recommendations or search results to visitors is provided. The method includes receiving a request from a client device for a digital map of a geographic area, and determining that the geographic area is unfamiliar to the user. In response to determining that the geographic area is unfamiliar to the user, the method includes determining one or more local businesses within the geographic area which are of interest to the user, where each of the one or more local businesses have less than a threshold number of retail locations or have each retail location within the same local area, and providing, to the client device, the digital map of the geographic area including indications of the one or more local businesses.

In another embodiment, a computing device for providing local business-based recommendations or search results to visitors is provided. The computing device includes one or more processors and a non-transitory computer-readable memory coupled to the one or more processors and storing instructions thereon. When executed by the one or more processors, the instructions cause the computing device to receive a request from a client device for a digital map of a geographic area, and determine that the geographic area is unfamiliar to the user. In response to determining that the geographic area is unfamiliar to the user, the instructions cause the computing device to identify one or more local businesses within the geographic area which are of interest to the user, where each of the one or more local businesses have less than a threshold number of retail locations or have each retail location within the same local area, and provide, to the client device, the digital map of the geographic area including indications of the one or more local businesses.

In yet another embodiment, a non-transitory computer-readable memory coupled to one or more processors and storing instructions thereon is provided. When executed by the one or more processors, the instructions cause the one or more processors to receive a request from a client device for a digital map of a geographic area, and determine that the geographic area is unfamiliar to the user. In response to determining that the geographic area is unfamiliar to the user, the instructions cause the one or more processors to identify one or more local businesses within the geographic area which are of interest to the user, where each of the one or more local businesses have less than a threshold number of retail locations or have each retail location within the same local area, and provide, to the client device, the digital map of the geographic area including indications of the one or more local businesses.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 3 illustrates an example data table including points of interest (POIs) and characteristics of each POI;

FIG. 5 illustrates an example calendar screen of a virtual calendar of the user including events the user is scheduled to attend and the respective locations of the events;

DETAILED DESCRIPTION

Figure 1:
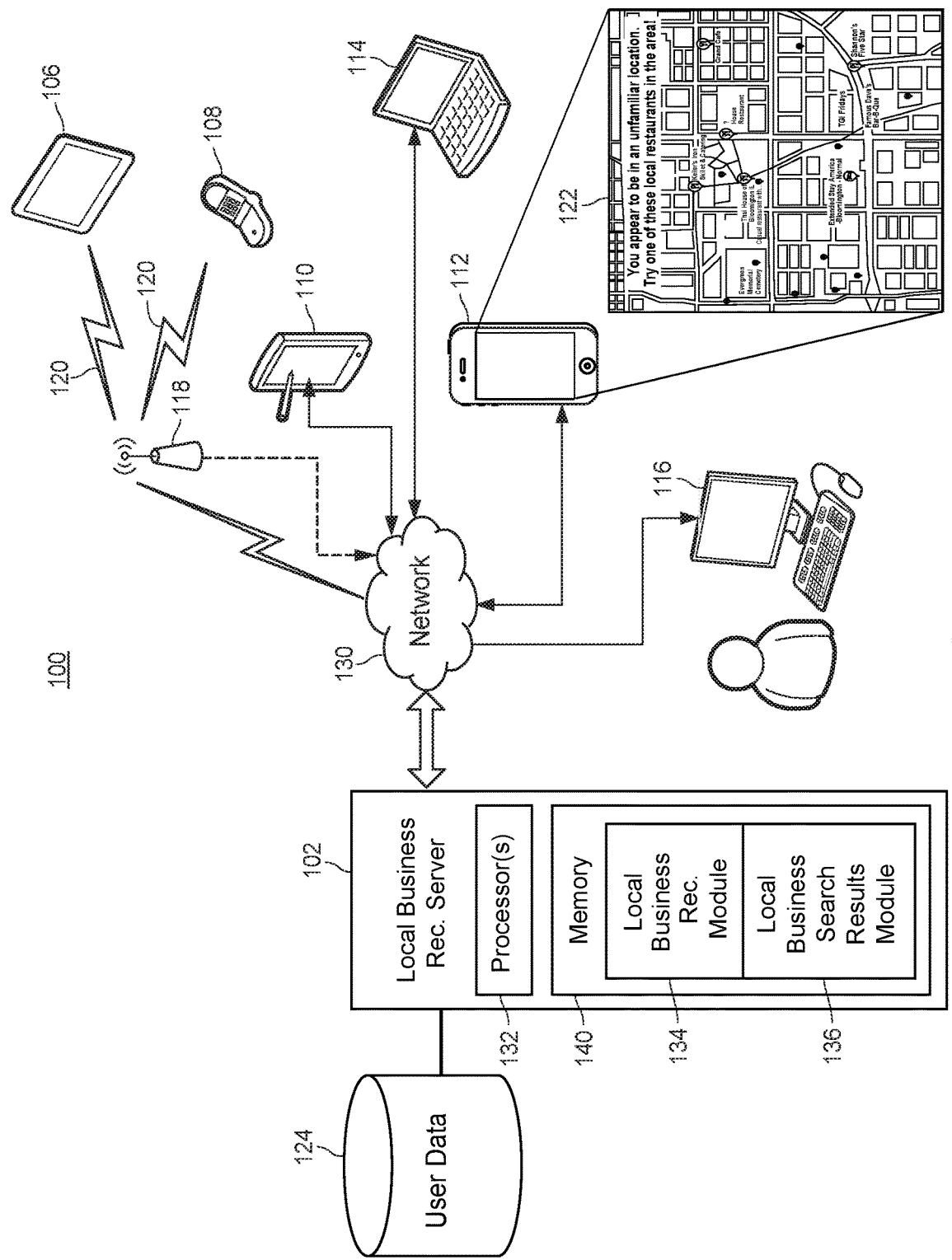
FIG. 1 illustrates a block diagram of a computer network and system on which an example local business recommendation system may operate in accordance with the presently described embodiments.

Although the following text sets forth a detailed description of numerous different embodiments, it should be understood that the legal scope of the description is defined by the words of the claims set forth at the end of this patent and equivalents. The detailed description is to be construed as example only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Accordingly, as used herein, the term "local business" may be used to refer to a business having less than a threshold number of retail locations, or where each of the retail locations is within a threshold geographic range (e.g., the same city, the same state, within a 100 mile radius, etc.). The term "national/global business," as used herein, may refer to any business which is not a local business.

Generally speaking, techniques for providing local business-based recommendations or search results to visitors may be implemented in one or several client devices, one or several network servers or a system that includes a combination of these devices. However, for clarity, the examples below focus primarily on an embodiment in which a client device generates a request for a digital map of a geographic area. The geographic area may include the current location of the client device or another location specified by the user. The client device may provide the request along with identification information for the user for accessing the user's profile to a local business recommendation server. The local business recommendation server may determine whether the geographic area is familiar to the user based on user profile data in the user profile, such as for example, location history data for the user indicating locations that the user visited, routes the user travelled along, etc. If the geographic area is unfamiliar to the user, the local business recommendation server may identify local businesses within the geographic area to recommend to the user or may boost the rankings of geographic search results which correspond to local businesses in response to a geographic search query from the user. The local business recommendation server may then generate a map display that includes indications of the local businesses and/or a ranked set of geographic search results, and may provide the map display to be presented on the client device.

Referring to FIG. 1, an example local business recommendation system 100 includes a local business recommendation server 102 and a plurality of client computing devices 106-116 which may be communicatively connected through a network 130, as described below. According to embodiments, the local business recommendation server 102 may be a combination of hardware and software components, also as described in more detail below. The local business recommendation server 102 may have an associated database 124 for storing data related to the operation of the local business recommendation system 100 (e.g., user profile data for users, POI data indicating for each POI, the name, location, type of business, size of the business, etc.). Moreover, the local business recommendation server 102 may include one or more processor(s) 132 such as a microprocessor coupled to a memory 140.

The memory 140 may be tangible, non-transitory memory and may include any types of suitable memory modules, including random access memory (RAM), read-only memory (ROM), flash memory, other types of persistent memory, etc. The memory 140 may store, for example instructions executable on the processors 132 for a local business recommendation module 134, and a local business search results module 136. The local business recommendation server 102 is described in more detail below with reference to FIG. 2A.

The local business recommendation module 134 may receive a request from one of the client computing devices 106-116 for a digital map of a geographic area. In some embodiments, the request may include the current location of the user, or another location specified by the user. In other embodiments, the request may include a location of an event that the user is scheduled to attend, or the local business recommendation module 134 may identify an event that the user is scheduled to attend by subscribing to the user's calendar feed that the user shares with the local business recommendation server 102. The local business recommendation module 134 may also receive identification information for the user from the client computing device 106-116, such as a user identifier (ID) which uniquely identifies the user. The local business recommendation module 134 may then access a user profile for the user with the user ID, which may be stored in the database 124 for example. If the user shares location data with the local business recommendation server 102, the user profile may include a location history for the user indicating the user's home location, work location, locations previously visited by the user, routes in which the user previously travelled, previous navigation requests made by the user, etc.

The local business recommendation module 134 may compare the locations from the location history to the boundaries of the requested geographic area to determine whether the user has visited the geographic area, and/or the frequency in which the user visited the geographic area. In some embodiments, the local business recommendation module 134 may generate a familiarity score for the geographic area based on how often the user visited the geographic area, passed by the geographic area, has been within a threshold distance of the geographic area, and/or how often the user visited other geographic areas. The familiarity score may correspond to an estimated probability that the user is familiar with the geographic area. For example, the familiarity score may be in proportion to the ratio of the number of times the user visited the geographic area compared to the number of times the user visited other geographic areas. The familiarity score may also be based on how recently the user visited the geographic area. For example, if the user has visited the geographic area multiple times but the most recent time was more than ten years ago, the familiarity score may be lower than a geographic area that the user visited once last week. The geographic area may have been very familiar to the user at one point in time, but the user may have moved away from the geographic area and it may no longer be familiar. Accordingly, the number of times the user visited the geographic area may be weighted based on recency, where more recent visits to the geographic area are weighted higher. The local business recommendation module 134 may then determine whether the user is familiar with the geographic area by for example, comparing the familiarity score to a threshold score. If the local business recommendation module 134 determines that the user is unfamiliar with the geographic area, the local business recommendation module 134 may provide recommendations or suggestions of locations for the user to visit within the geographic area.

The local business recommendation module 134 may obtain map data from a map database or may invoke a mapping application programming interface (API) to retrieve points of interest (POIs) within the geographic area. For each POI, the local business recommendation module 134 may determine whether the POI is a local business or a national/global business. The local business recommendation module 134 may determine the size of the POI based on the number of retail locations for the business corresponding to the POI and/or the geographic range of the retail locations. If the business corresponding to the POI (e.g., Dairy Queen®) has less than a threshold number of retail locations (e.g., three, five, seven, etc.), or each of the locations for the business corresponding to the POI are within a threshold geographic range (e.g., the same city, the same state, within a 100 mile radius, etc.), the local business recommendation module 134 may determine that the POI is a local business. Otherwise, the local business recommendation module 134 may determine that the POI is a national or global business. In some embodiments, the local business recommendation module 134 determines whether a POI is a local business based on any suitable combination of the number of retail locations and/or the geographic range of the retail locations.

In some embodiments, the local business recommendation module 134 selects each of the local businesses within the geographic area to recommend to the user. In other embodiments, the local business recommendation module 134 selects local businesses within the geographic area based on the time of day, time of year, reviews of the local businesses, businesses previously visited by the user from the user profile data, etc. The local business recommendation module 134 may generate a score for each local business and may select local businesses having scores above a threshold score or ranked above a threshold ranking according to the respective scores. For example, the local business recommendation module 134 may generate a popularity score for each local business, and may select local businesses having popularity scores above a threshold score. More specifically, the local business recommendation module 134 may generate a popularity score for each local business based on a number of users who visit the local business, a frequency in which users visit the local business, a duration in which users visit the local business, reviews of the local business, etc. These characteristics may be determined from various online sources, such as Yelp®, OpenTable®, etc.

Still further, the local business recommendation module 134 may select local businesses within the geographic area based on events the user is scheduled to attend within the geographic area according to the user's virtual calendar, for example. If the user has reservations at a restaurant for example, the local business recommendation module 134 may select local businesses that serve dessert, after dinner drinks, or provide after dinner entertainment. If the user is scheduled to attend a concert in the geographic area, the local business recommendation module 134 may select local restaurants for dinner before the concert.

Then the local business recommendation module 134 may generate a digital map of the geographic area using the map data. The local business recommendation module 134 may also provide indications of the selected local businesses which may be overlaid on the digital map at their respective locations within the geographic area. The local business recommendation module 134 may provide the digital map of the geographic area including the indications of the selected local businesses to the client computing device 106-116 for display on a user interface. In other embodiments, the local business recommendation module 134 may provide map data corresponding to the geographic area to the client computing device 106-116, and the client computing device 106-116 may generate the digital map of the geographic area including indications of the selected local businesses at their respective locations within the geographic area.

In addition to providing recommendations and suggestions to the user when the user is visiting an unfamiliar geographic area, the local business recommendation server 102 may provide search results for search queries related to the geographic area. More specifically, the local business search results module 136 may receive a search query for a geographic area in which the user is unfamiliar. The local business search results module 136 may then obtain a set of geographic search results including POIs within the geographic area which are related to the search query. In some embodiments, the geographic search results may be a ranked set of search results, where each search result has a corresponding relevance score indicating the relevance of the search result to the search query. The local business search results module 136 may obtain the set of geographic search results by invoking the mapping API and providing the geographic search query to a map data server via the mapping API. In other embodiments, the local business search results module 136 may obtain the set of geographic search results by providing the geographic search query to a search engine.

The local business search results module 136 may then adjust the ranked set of geographic search results to boost the rankings for local businesses. More specifically, for each search result in the set of search results, the local business search results module 136 may determine whether the search result corresponds to a local business or a national/global business, for example using the techniques described above. Then the local business search results module 136 may increase the relevance score for each of the search results corresponding to local businesses, and may rank the geographic search results according to their adjusted relevance scores. In some embodiments, the local business search results module 136 may boost the relevance score by a predetermined amount for each local business. In other embodiments, the local business search results module 136 may boost the relevance scores, such that local businesses are ranked above national/global businesses in the ranked set of geographic search results. The local business search results module 136 may then provide the boosted set of geographic search results to the client computing device 106-116 for display on a user interface. Additionally, the local business search results module 136 may provide indications of a subset of the geographic search results each corresponding to a local business to the client computing device 106-116 for display on a digital map of the geographic area.

The client computing devices 106-116 may include, by way of example, various types of "mobile devices," such as a tablet computer 106, a cell phone 108, a personal digital assistant (PDA) 110, a smart phone 112, a laptop computer 114, a desktop computer 116, a portable media player (not shown), a home phone, a pager, a wearable computing device, smart glasses, smart watches or bracelets, phablets, other smart devices, devices configured for wired or wireless RF (Radio Frequency) communication, etc. Of course, any client computing device appropriately configured may interact with the local business recommendation system 100. The client computing devices 106-116 need not necessarily communicate with the network 130 via a wired connection. In some instances, the client computing devices 106-116 may communicate with the network 130 via wireless signals 120 and, in some instances, may communicate with the network 130 via an intervening wireless or wired device 118, which may be a wireless router, a wireless repeater, a base transceiver station of a mobile telephony provider, etc.

Each of the client computing devices 106-116 may interact with the local business recommendation server 102 to receive web pages and/or server data and may display the web pages and/or server data via a client application and/or an Internet browser (described below). For example, the smart phone 112 may display a local business map display 122, may capture a current location of the user, and may interact with the local business recommendation server 102.

The local business recommendation server 102 may communicate with the client computing devices 106-116 via the network 130. The digital network 130 may be a proprietary network, a secure public Internet, a local area network (LAN), a wide area network (WAN), a virtual private network (VPN) or some other type of network, such as dedicated access lines, plain ordinary telephone lines, satellite links, combinations of these, etc. Where the digital network 130 comprises the Internet, data communication may take place over the digital network 130 via an Internet communication protocol.

Figure 2A:
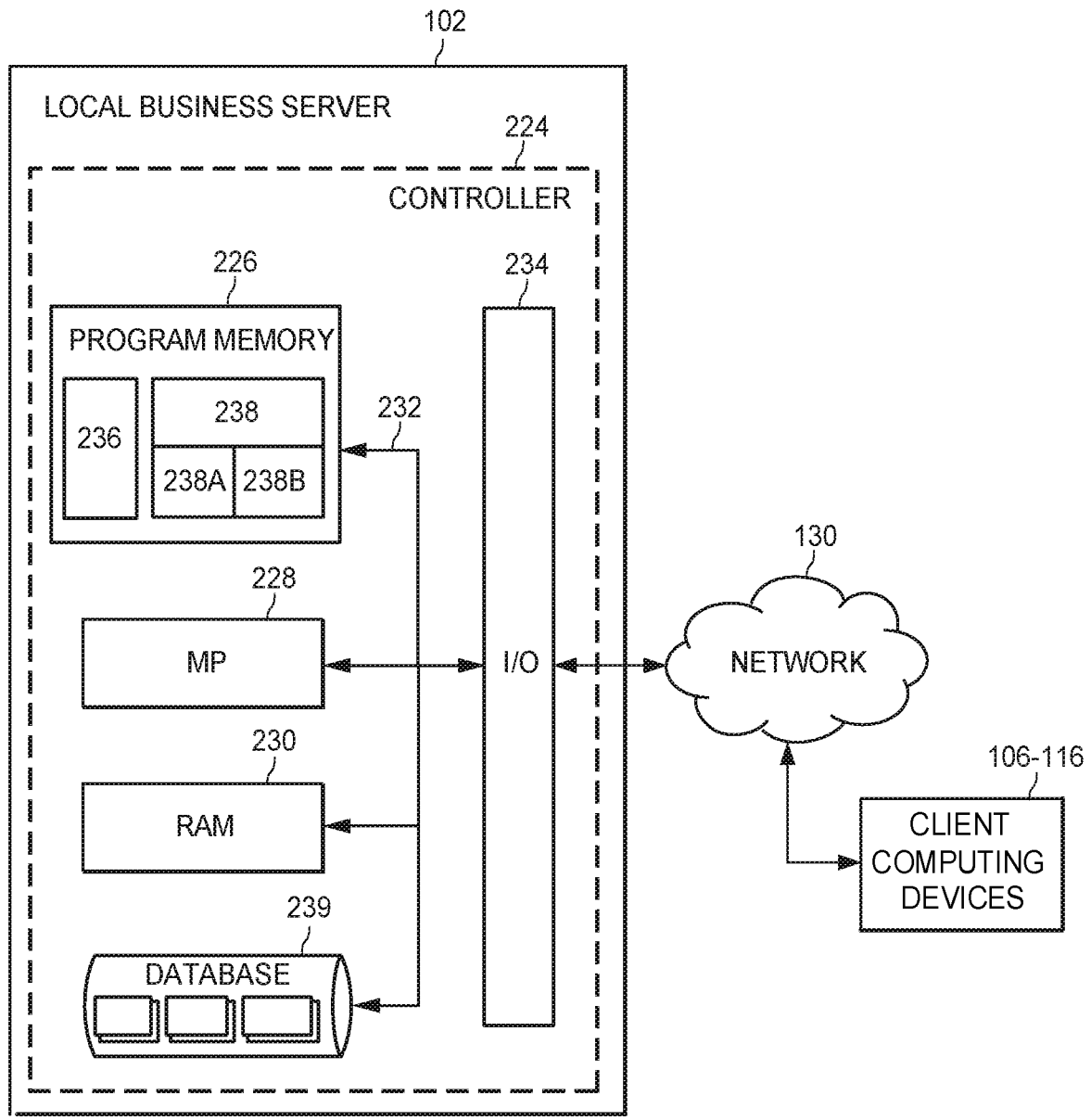
FIG. 2A illustrates a block diagram of an example server device that can operate in the system of FIG. 1.

Turning now to FIG. 2A, the local business recommendation server 102 may include a controller 224. The controller 224 may include a program memory 226, a microcontroller or a microprocessor (MP) 228, a random-access memory (RAM) 230, and/or an input/output (I/O) circuit 234, all of which may be interconnected via an address/data bus 232. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as user profile data, web page templates and/or web pages, and other data necessary to interact with users through the network 130. It should be appreciated that although FIG. 2A depicts only one microprocessor 228, the controller 224 may include multiple microprocessors 228. Similarly, the memory of the controller 224 may include multiple RAMs 230 and/or multiple program memories 226. Although FIG. 2A depicts the I/O circuit 234 as a single block, the I/O circuit 234 may include a number of different types of I/O circuits. The controller 224 may implement the RAM(s) 230 and/or the program memories 226 as semiconductor memories, magnetically readable memories, and/or optically readable memories, for example.

As shown in FIG. 2A, the program memory 226 and/or the RAM 230 may store various applications for execution by the microprocessor 228. For example, a user-interface application 236 may provide a user interface to the local business recommendation server 102, which user interface may, for example, allow a system administrator to configure, troubleshoot, or test various aspects of the server's operation. A server application 238 may operate to receive a request for a digital map of a geographic area, generate indications of recommended local businesses and/or geographic search results corresponding to local business to include in the digital map, and transmit map data for presenting the digital map on the user's client computing device 106-116. The server application 238 may be a single module 238 or a plurality of modules 238A, 238B, such as the local business recommendation module 134, and the local business search results module 136.

While the server application 238 is depicted in FIG. 2A as including two modules, 238A and 238B, the server application 238 may include any number of modules accomplishing tasks related to implementation of the local business recommendation server 102. Moreover, it will be appreciated that although only one local business recommendation server 102 is depicted in FIG. 2A, multiple local business recommendation servers 102 may be provided for the purpose of distributing server load, serving different web pages, etc. These multiple local business recommendation servers 102 may include a web server, an entity-specific server (e.g. an Apple® server, etc.), a server that is disposed in a retail or proprietary network, etc.

Figure 2B:
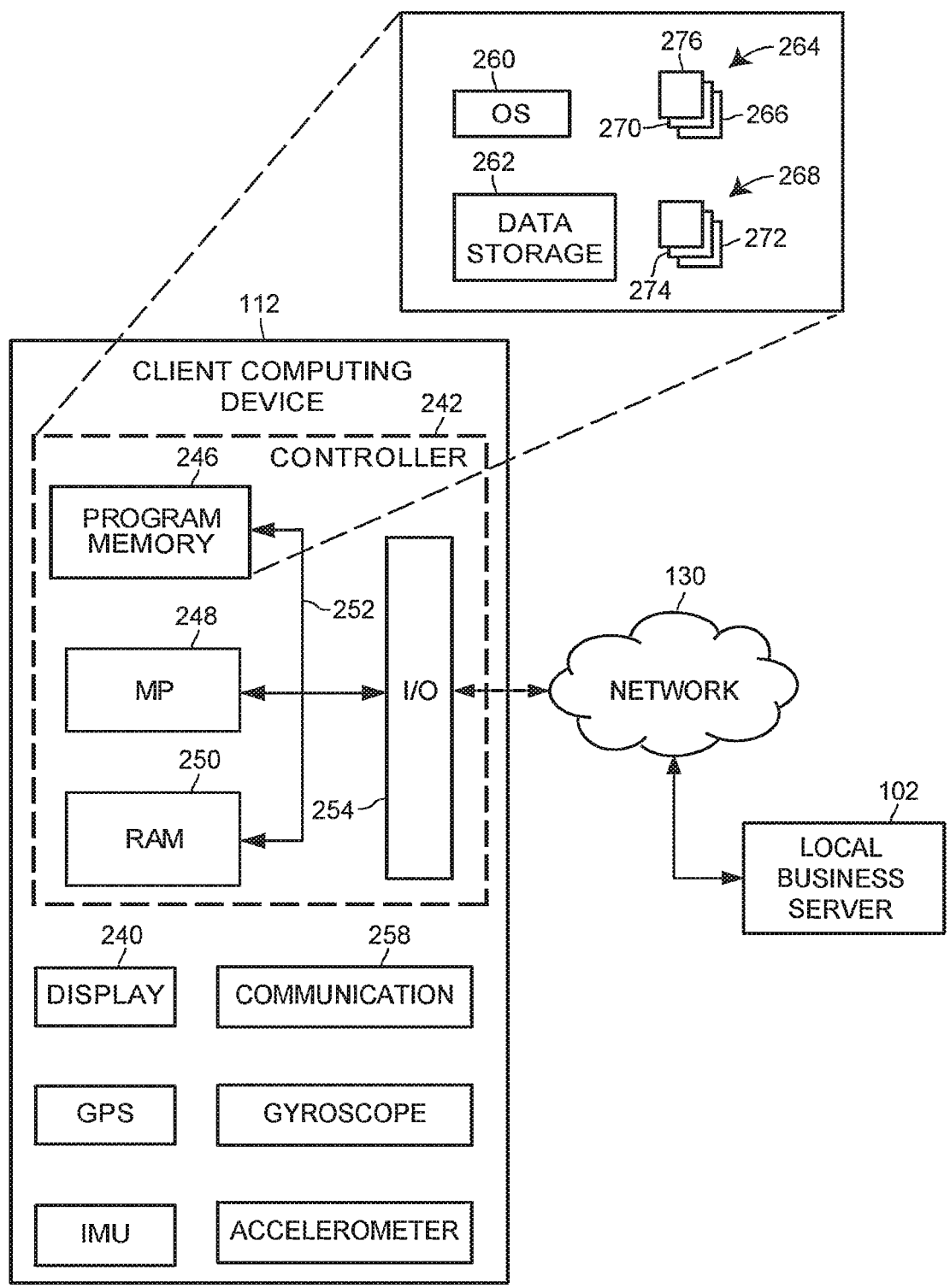
FIG. 2B illustrates an example client device that can operate in the system of FIG. 1.

Referring now to FIG. 2B, the smart phone 112 (or any of the client computing devices 106-116) may include a display 240, a communication unit 258, a positioning sensor such as a Global Positioning System (GPS) (not shown), a user-input device (not shown), and, like the local business recommendation server 102, a controller 242.

Similar to the controller 224, the controller 242 may include a program memory 246, a microcontroller or a microprocessor (MP) 248, a random-access memory (RAM) 250, and/or an input/output (I/O) circuit 254, all of which may be interconnected via an address/data bus 252. The program memory 246 may include an operating system 260, a data storage 262, a plurality of software applications 264, and/or a plurality of software routines 268. The operating system 260, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

The data storage 262 may include data such as user profiles, application data for the plurality of applications 264, routine data for the plurality of routines 268, and/or other data necessary to interact with the local business recommendation server 102 through the digital network 130.

In some embodiments, the controller 242 may also include, or otherwise be communicatively connected to, other data storage mechanisms (e.g., one or more hard disk drives, optical storage drives, solid state storage devices, etc.) that reside within the client computing device 112.

The communication unit 258 may communicate with the local business recommendation server 102 via any suitable wireless communication protocol network, such as a wireless telephony network (e.g., GSM, CDMA, LTE, etc.), a Wi-Fi network (802.11 standards), a WiMAX network, a Bluetooth network, etc. The user-input device (not shown) may include a "soft" keyboard that is displayed on the display 240 of the client computing device 112, an external hardware keyboard communicating via a wired or a wireless connection (e.g., a Bluetooth keyboard), an external mouse, or any other suitable user-input device.

As discussed with reference to the controller 224, it should be appreciated that although FIG. 2B depicts only one microprocessor 248, the controller 242 may include multiple microprocessors 248. Similarly, the memory of the controller 242 may include multiple RAMs 250 and/or multiple program memories 246. Although the FIG. 2B depicts the I/O circuit 254 as a single block, the I/O circuit 254 may include a number of different types of I/O circuits. The controller 242 may implement the RAM(s) 250 and/or the program memories 246 as semiconductor memories, magnetically readable memories, and/or optically readable memories, for example.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and/or transmitting information from the client computing device 112.

One of the plurality of applications 264 may be a native application and/or web browser 270, such as Apple's Safari®, Google Chrome™, Microsoft Internet Explorer®, and Mozilla Firefox® that may be implemented as a series of machine-readable instructions for receiving, interpreting, and/or displaying web page information from the server 102 while also receiving inputs from the user. Another application of the plurality of applications may include an embedded web browser 276 that may be implemented as a series of machine-readable instructions for receiving, interpreting, and/or displaying web page information from the local business recommendation server 102. One of the plurality of routines may include a geographic search routine 272 which provides a geographic search query to the local business recommendation server 102. Another routine in the plurality of routines may include a local business recommendation display routine 274 which presents a digital map of a geographic area along with indications of recommended local businesses within the geographic area on the display 240.

To provide local business-based recommendations to a user, the local business recommendation server 102 may store a list of POIs and characteristics of each POI such as the size of the POI (e.g., local or national/global). FIG. 3 illustrates an example data table 300 including POIs and characteristics of each POI, which may be stored in the database 124. The data table 300 may include a business ID 302 which uniquely identifies the POI, the name 304 of the business corresponding to the POI, the location 306 of the POI, the size of the business corresponding to the POI 308 (local, national/global, etc.), and the type of business 310 for the POI.

The local business recommendation server 102 may determine the size of the POI based on the number of retail locations for the business corresponding to the POI and/or the geographic range of the retail locations. If the business corresponding to the POI (e.g., Dairy Queen®) has less than a threshold number of retail locations (e.g., three, five, seven, etc.), or each of the locations for the business corresponding to the POI are within a threshold geographic range (e.g., the same city, the same state, within a 100 mile radius, etc.) the local business recommendation server 102 may determine that the POI is a local business. Otherwise, the local business recommendation server 102 may determine that the POI is a national/global business. In some embodiments, the local business recommendation server 102 determines whether a POI is a local business based on any suitable combination of the number of retail locations and/or the geographic range of the retail locations.

The local business recommendation server 102 may also determine the size of the POI based on any suitable combination of the number of employees for the business corresponding to the POI, an amount of revenue for the business corresponding to the POI, content included in reviews of the POI, etc. The local business recommendation server 102 may obtain an indication of the number of retail locations for the business corresponding to the POI and/or the geographic range of the retail locations from the map database or by invoking the mapping API to retrieve indications of each retail location for the business corresponding to the POI. The local business recommendation server 102 may obtain reviews of the POI from online sources, such as Yelp®, OpenTable®, etc., and may analyze the reviews to identify terms such as "local" or "neighborhood." The local business recommendation server 102 may obtain business data such as the number of employees for the business corresponding to the POI, the amount of revenue for the business corresponding to the POI, etc. from various online sources. Additionally, the local business recommendation server 102 may determine the type of business for the POI from the map database, by invoking the mapping API, or from various online sources. The local business recommendation server 102 may then store indications of sizes of POIs and the type of businesses for the POIs in the data table 300.

Figure 4:
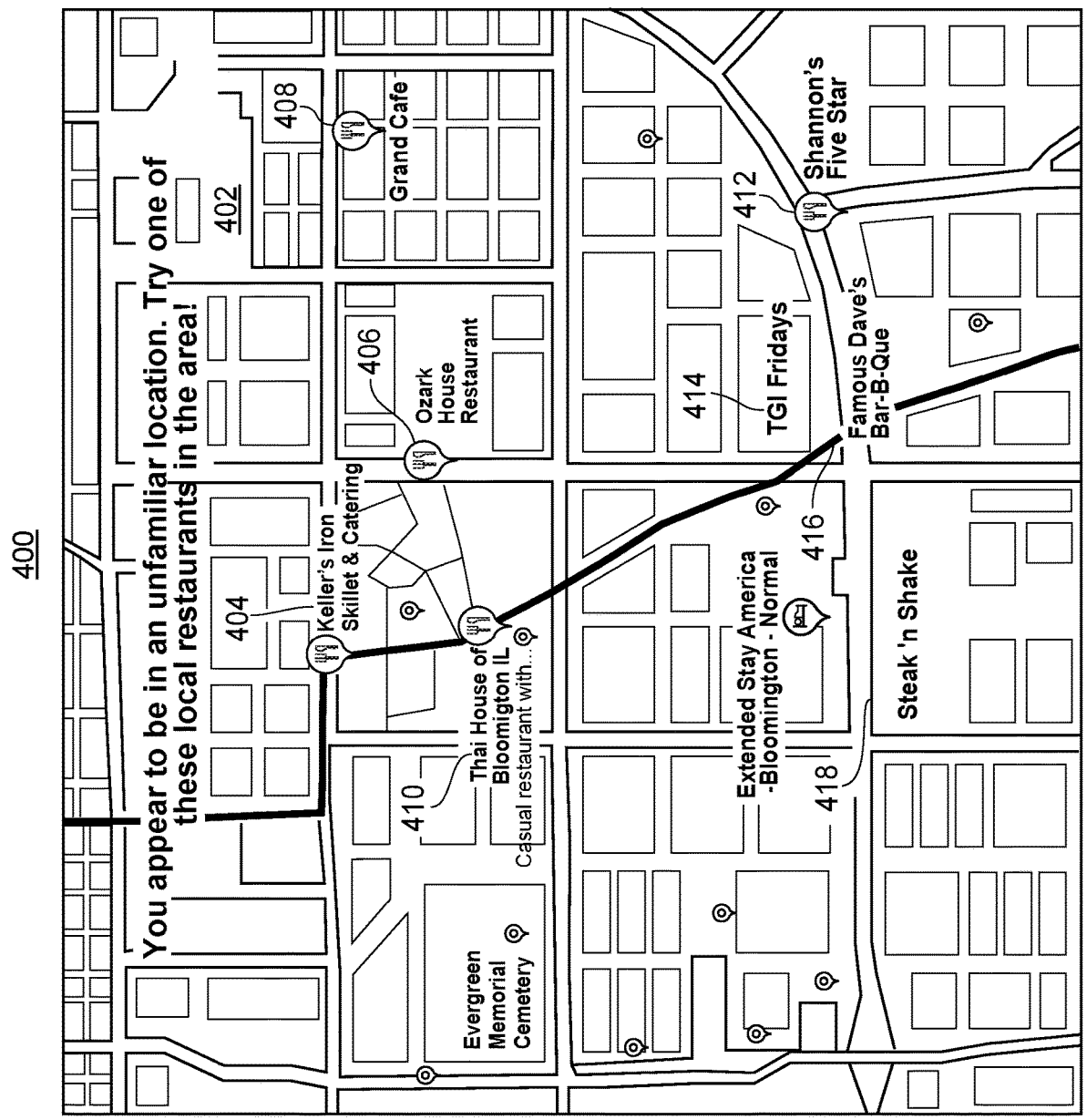
FIG. 4 illustrates an example map display of recommended local businesses for a user unfamiliar with the geographic area to visit which may be presented on the client device.
Figure 6:
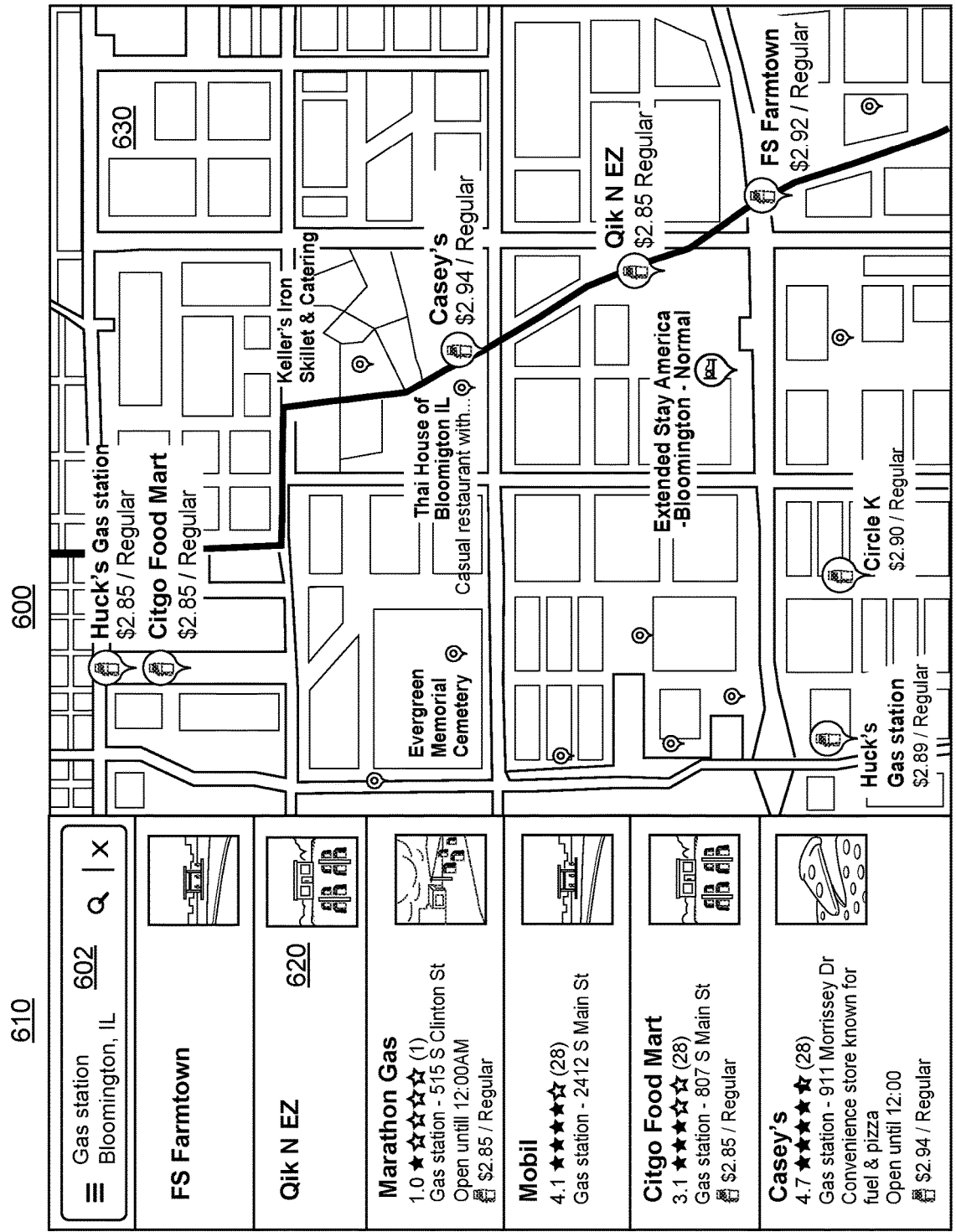
FIG. 6 illustrates an example geographic search results display which may be presented on the client device depicting a set of ranked geographic search results in response to a geographic search query by the user, where the geographic search results corresponding to local businesses are boosted in the rankings.

Turning back to FIG. 2B, a user may launch the client application 266 from the client computing device 112, to communicate with the local business recommendation server 102 to implement the local business recommendation system. Additionally, the user may also launch or instantiate any other suitable user interface application (e.g., the native application or web browser 270, or any other one of the plurality of software applications 264) to access the local business recommendation server 102 to realize the local business recommendation system. FIGS. 4 and 6 illustrate example displays which may be presented on the user interface of the client computing device 106-116.

More specifically, FIG. 4 illustrates an example map display 400 of recommended local businesses for a user unfamiliar with the geographic area which may be presented on the client computing device 106-116. The example map display 400 includes a digital map 402 of a geographic area which may include the current location of the user. In another scenario, the geographic area may include a location provided by the user, for example via user controls on the client application 266. In other scenarios, the geographic area may include a location automatically selected by the client computing device 106-116 and/or the local business recommendation server 102 based on an event in which the user is scheduled to attend.

The example map display 400 may include POIs 404-418 within the geographic area, where POIs corresponding to local businesses 404-412 are highlighted on the map display 400 with pins, and the names of the POIs corresponding to local businesses 404-412 (e.g., Keller's Iron Skillet and Catering, Ozark House Restaurant 406, Grand Cage, and Thai House of Bloomington) are highlighted in bold. POIs corresponding to national/global businesses 414-418 (e.g., TGI Fridays®, Famous Dave's Bar-B-Que®, and Steak 'n Shake®) are not highlighted on the map display 400. However, this is merely one example in which POIs corresponding to local businesses 404-412 may be highlighted on the map display 400. Local businesses 404-412 may be highlighted in any suitable manner with any suitable indication of the local business. In some embodiments, national/global businesses may not appear at all on the map display 400.

Additionally, in some embodiments, some of the POIs corresponding to local businesses may be filtered out on the map display 400 or may not be highlighted on the map display. For example, the local business recommendation module 134 may select local businesses within the geographic area based on the time of day, time of year, reviews of the local businesses, businesses previously visited by the user from the user profile data, etc. The local business recommendation module 134 may generate a score for each local business and may select local businesses having scores above a threshold score or ranked above a threshold ranking according to the respective scores. For example, between 6 p.m. and 8 p.m., the local business recommendation module 134 may select local restaurants for dinner. Accordingly, the map display 400 may only present or highlight the selected local businesses.

Still further, the local business recommendation module 134 may select local businesses within the geographic area based on events the user is scheduled to attend within the geographic area according to the user's virtual calendar, for example. If the user has reservations at a restaurant for example, the local business recommendation module 134 may select local businesses that serve dessert, after dinner drinks, or provide after dinner entertainment. If the user is scheduled to attend a concert in the geographic area, the local business recommendation module 134 may select local restaurants for dinner before the concert.

More specifically, the client computing device 106-116 may include a virtual calendar application (not shown), and may present a calendar screen 500 as shown in FIG. 5, via the virtual calendar application (not shown). The calendar screen 500 may include a monthly calendar view, such as June 2019 (ref. no. 502), a yearly calendar view, a weekly calendar view, a daily calendar view, etc. displaying one or several dates within the time frame of the view (e.g., Jun. 1, 2019-Jun. 30, 2019). The calendar may include dates, times, and locations 504*a-c* of events the user is scheduled to attend, such as sporting events, concerts, restaurants, business meetings, vacation destinations, etc. The client application 266 may include user controls for the user to allow the local business recommendation server 102 to subscribe to the user's virtual calendar, so that the local business recommendation server 102 may obtain the dates, times, and locations of events the user is scheduled to attend. When an event on the user's virtual calendar is scheduled to take place within a threshold amount of time (e.g., within the next hour, within the next 12 hours, within the next 24 hours, etc.), the local business recommendation server 102 may provide map data for the client application 266 to present a digital map of a geographic area including the location of the event. The local business recommendation server 102 may identify local businesses within the geographic area, and may select local businesses for the user to attend before or after the event. The selected local businesses may be presented and highlighted in the map display on the client computing device 106-116, such as the map display 400.

More specifically, to subscribe to the user's virtual calendar the virtual calendar application may generate a calendar subscription link. For example, the calendar subscription link may be an iCalendar feed or Rich Site Summary (RSS) feed. The calendar subscription link may be provided to the customer's client computing device 106-116 and more specifically to the client application, via a user identifier such as an email address or phone number. The user may be presented with the option to subscribe to the virtual calendar specific, thereby authorizing the virtual calendar application to communicate the virtual calendar to the client application 266 or the local business recommendation server 102 via the iCalendar or RSS feed.

When the local business recommendation server 102 subscribes, the local business recommendation server 102 or the client application 266 may obtain calendar events from the virtual calendar via the iCalendar or RSS feed. When the calendar event is added to the virtual calendar, the local business recommendation server 102 may receive the calendar event via the iCalendar or RSS feed. In some embodiments, a calendar event may be generated in an ICS file or any other suitable format supported by virtual calendar applications such as Google Calendar™, Microsoft Outlook®, Yahoo Calendar™, or Apple's iCal®.

In addition to presenting recommendations of local businesses for a user to visit within a geographic area, the local business recommendation server 102, and more specifically the local business search results module 136 may receive a geographic search query from the client computing device 106-116 and generate a set of geographic search results. The set of geographic search results may be ranked according to relevance to the search query, and search results corresponding to local businesses may be boosted in the ranked set of geographic search results.

FIG. 6 illustrates an example geographic search results display 600 depicting a set of ranked geographic search results in response to a geographic search query by the user. The geographic search results display 600 includes a search portion 610 including a search field 602 for the user to enter a geographic search query (e.g., "gas station Bloomington, IL"), and a set of ranked geographic search results 620 responsive to the geographic search query. The geographic search results display 600 may also include a map display 630 of the geographic area included in the geographic search query (e.g., Bloomington, IL) along with indications of the geographic search results.

The client computing device 106-116 may provide the geographic search query to the local business recommendation server 102 which may generate a set of geographic search results in response to the geographic search query. The local business recommendation server 102 may generate the set of geographic search results in response to the geographic search query by providing the geographic search query to a search engine or invoking a mapping API and providing the geographic search query to a map data server via the mapping API.

In some embodiments, the geographic search results may be ranked according to relevance or in any other suitable manner. Each geographic search result may have a corresponding relevance score which may be used to ranked the set of geographic search results. The relevance score may be based on any suitable combination of the proximity of the search result to the geographic area included in the geographic search query, the relevance of the search result to the subject of the geographic search query, popularity of the search result such as based on reviews of the search result, a number of check-ins at the search result, etc. The local business recommendation server 102 may then adjust the ranked set of geographic search results to boost the rankings for local businesses. More specifically, for each search result in the set of search results, the local business recommendation server 102 may determine whether the search result corresponds to a local business or a national/global business, for example using the techniques described above. Then the local business recommendation server 102 may increase the relevance score for each of the search results corresponding to local businesses, and may rank the geographic search results according to their adjusted relevance scores. In some embodiments, the local business recommendation server 102 may boost the relevance score by a predetermined amount for each local business. In other embodiments, the local business recommendation server 102 may boost the relevance scores, such that local businesses are ranked above national/global business in the ranked set of geographic search results.

In the example search results 620, FS Farmtown and Qik N Ez may be local businesses while Marathon Gas®, Mobil®, Citgo Food Mart®, Casey's®, and Circle K® may be national/global businesses. While FS Farmtown and Qik N Ez may not be ranked at the top in the initial set of ranked search results, FS Farmtown and Qik N Ez may be boosted in the rankings, such that they are ranked first and second respectively. Indications of the search results 620 may be presented on the map display 630, such as by highlighting the search results 620 in bold, and/or by including a pin at the locations of the search results 620 which may be distinguishable from pins for other POIs which are not search results. The search results 620 may also be presented and/or highlighted on the map display 630 in any other suitable manner. In other embodiments, indications of a subset of the search results corresponding to local businesses may be presented on the map display 630, such as by highlighting the local businesses in bold, and/or by including a pin at the locations of the local businesses which may be distinguishable from pins for other POIs which are not local businesses.

Figure 7:
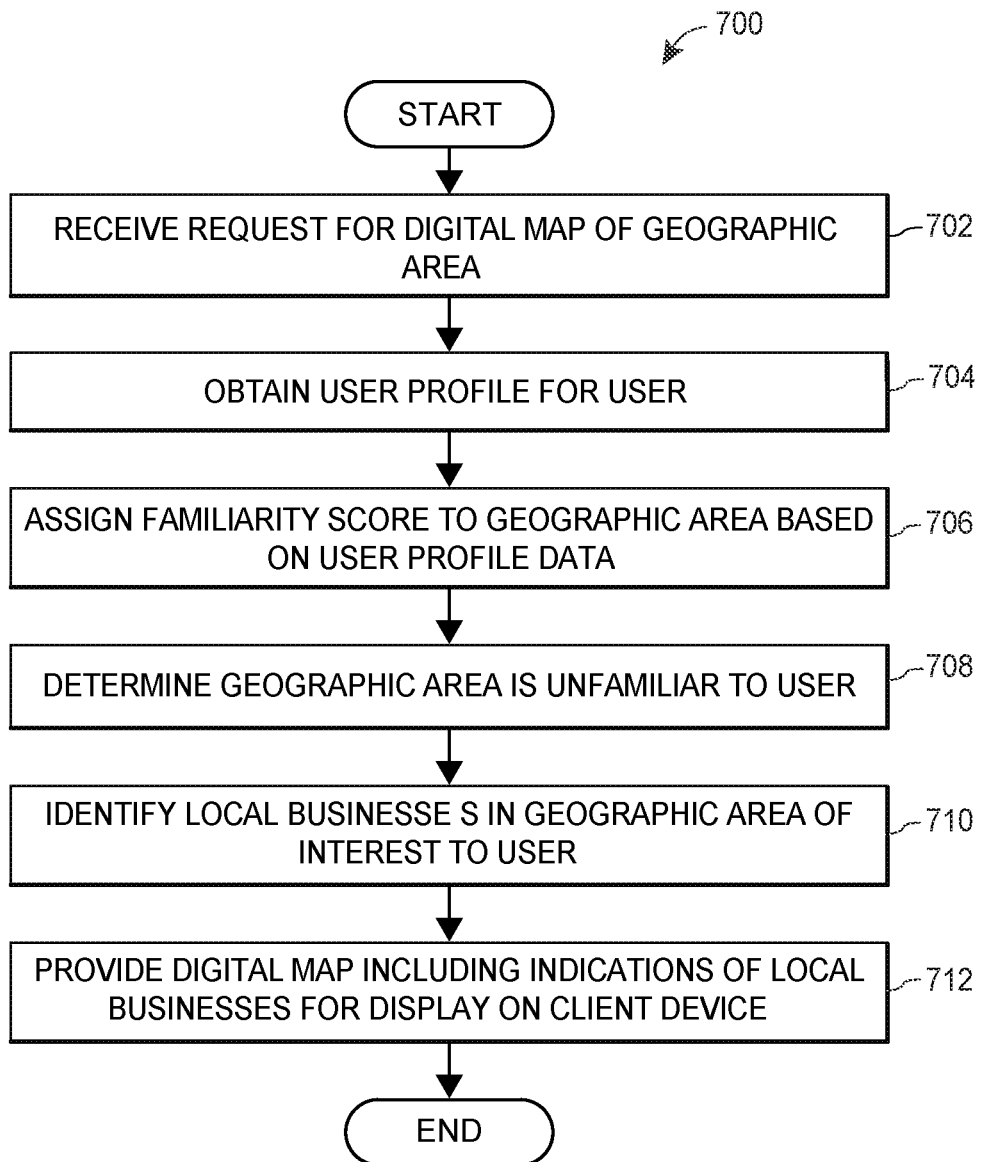
FIG. 7 illustrates a flow diagram representing an example method for providing local business-based recommendations or search results to visitors which may be implemented by the server device.

FIG. 7 depicts a flow diagram representing an example method 700 for providing local business-based recommendations or search results to visitors. The method 700 may be executed on the local business recommendation server 102. In some embodiments, the method 700 may be implemented in a set of instructions stored on a non-transitory computer-readable memory and executable on one or more processors of the local business recommendation server 102. For example, the method 700 may be at least partially performed by the local business recommendation module 134 and the local business search results module 136 as shown in FIG. 1.

At block 702, the local business recommendation server 102 receives a request for a digital map of a geographic area. The request may be received from a client computing device 106-116, and may include the current location of the user of the client computing device 106-116, another location specified by the user (e.g., via user controls on the client application 266), or a location automatically selected by the client computing device 106-116. In other embodiments, the request may include a location of an event that the user is scheduled to attend, or the local business recommendation module 134 may identify an event that the user is scheduled to attend by subscribing to the user's calendar feed that the user shares with the local business recommendation server 102.

The local business recommendation server 102 may also receive identification information for the user from the client computing device 106-116, such as a user ID which uniquely identifies the user. The local business recommendation server 102 may then access a user profile for the user with the user ID (block 704), which may be stored in the database 124 for example. If the user shares location data with the local business recommendation server 102, the user profile may include a location history for the user indicating the user's home location, work location, locations previously visited by the user, routes in which the user previously travelled, etc.

The local business recommendation server 102 may compare the locations from the location history to the boundaries of the requested geographic area to determine whether the user has visited the geographic area, and/or the frequency in which the user visited the geographic area. For example, the local business recommendation server 102 may generate a familiarity score for the geographic area based on how often the user visited the geographic area, passed by the geographic area, has been within a threshold distance of the geographic area, and/or how often the user visited other geographic areas (block 706). The local business recommendation server 102 may then determine whether the user is familiar with the geographic area by for example, comparing the familiarity score to a threshold score. If the familiarity score is less than a threshold score, the local business recommendation server 102 may determine that the user is unfamiliar with the geographic area (block 708).

In response to determining that the user is unfamiliar with the geographic area, the local business recommendation server 102 may identify local businesses in the geographic area which are of interest to the user (block 710). Local businesses which are of interest to the user may include recommended local businesses for the user according to the time of day, time of year, the user's location history, events the user is scheduled to attend, or according to a geographic search query provided by the user. More specifically, the local business recommendation server 102 may obtain map data from a map database or may invoke a mapping API to retrieve POIs within the geographic area. For each POI, the local business recommendation server 102 may determine whether the POI is a local business or a national/global business. The local business recommendation server 102 may determine the size of the POI based on the number of retail locations for the business corresponding to the POI and/or the geographic range of the retail locations. If the business corresponding to the POI has less than a threshold number of retail locations, or each of the locations for the business corresponding to the POI are within a threshold geographic range (e.g., the same city, the same state, within a 100 mile radius, etc.) the local business recommendation server 102 may determine that the POI is a local business. Otherwise, the local business recommendation server 102 may determine that the POI is a national or global business. In some embodiments, the local business recommendation server 102 determines whether a POI is a local business based on any suitable combination of the number of retail locations and/or the geographic range of the retail locations.

In some embodiments, the local business recommendation server 102 selects each of the local businesses within the geographic area to recommend to the user. In other embodiments, the local business recommendation server 102 selects local businesses within the geographic area based on the time of day, time of year, reviews of the local businesses, etc. The local business recommendation server 102 may generate a score for each local business and may select local businesses having scores above a threshold score or ranked above a threshold ranking according to the respective scores. Still further, the local business recommendation server 102 may select local businesses within the geographic area based on events the user is scheduled to attend within the geographic area according to the user's virtual calendar, for example. If the user has reservations at a restaurant for example, the local business recommendation server 102 may select local businesses that serve dessert, after dinner drinks, or provide after dinner entertainment. If the user is scheduled to attend a concert in the geographic area, the local business recommendation server 102 may select local restaurants for dinner before the concert.

Then the local business recommendation server 102 may generate a digital map of the geographic area using the map data and provide the digital map including indications of the selected local business for display on a user interface of the client computing device 106-116 (block 712). The indications of the selected local businesses may be overlaid on the digital map at their respective locations within the geographic area. In other embodiments, the local business recommendation server 102 may provide map data corresponding to the geographic area to the client computing device 106-116, and the client computing device 106-116 may generate the digital map of the geographic area including indications of the selected local businesses at their respective locations within the geographic area.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as example only and does not describe every possible embodiment, as describing every possible embodiment would be impractical, if not impossible. One could implement numerous alternate embodiments, using either current technology or technology developed after the filing date of this application.

We claim:

1. A computer-implemented method for providing local business-based recommendations, the method comprising:
   identifying, by one or more processors, a set of points of interest (POIs) within a digital map of a geographic area received from a user;
   determining, by the one or more processors, one or more local businesses from the set of POIs that are of interest to the user, each local business of the one or more local businesses having less than a threshold number of retail locations or each local business of the one or more local businesses being within a threshold geographic range; and
   providing, by the one or more processors, indications of the one or more local businesses from the set of POIs in the digital map of the geographic area to the user.

2. The computer-implemented method of claim 1, wherein determining the one or more local businesses from the set of POIs that are of interest to the user comprises:
   identifying, by the one or more processors, a set of search results corresponding to a search query of the geographic area, the set of search results including the set of POIs within the geographic area;
   identifying, by the one or more processors, a subset of the set of search results corresponding to the one or more local businesses; and
   providing, by the one or more processors, indications of the subset of the set of search results in the digital map of the geographic area to the user.

3. The computer-implemented method of claim 2, further comprising:
   ranking, by the one or more processors, the set of search results according to relevance to the search query;
   boosting, by the one or more processors, rankings of the subset of the set of search results corresponding to the one or more local businesses; and
   providing, by the one or more processors, an indication of the rankings, as boosted, to a client device for display along with the digital map of the geographic area.

4. The computer-implemented method of claim 1, further comprising:
   identifying, by the one or more processors, user profile data of the user; and
   determining, by the one or more processors, that the geographic area is unfamiliar to the user based upon the user profile data.

5. The computer-implemented method of claim 4, wherein determining that the geographic area is unfamiliar to the user based upon the user profile data comprises:
   assigning, by the one or more processors, a familiarity score to the geographic area based upon a frequency in which the user has visited the geographic area and frequencies in which the user has visited other geographic areas; and
   determining, by the one or more processors, that the geographic area is unfamiliar to the user in response to determining that the familiarity score is below a threshold score.

6. The computer-implemented method of claim 4, wherein determining the one or more local businesses from the set of POIs that are of interest to the user comprises:
   identifying, by the one or more processors, one or more recommended types of businesses for the user; and
   identifying, by the one or more processors, the one or more local businesses by matching to the one or more recommended types of businesses.

7. The computer-implemented method of claim 6, wherein identifying the one or more recommended types of businesses for the user is based upon a time of day, a time of year, events within the geographic area, or businesses previously visited by the user from the user profile data.

8. The computer-implemented method of claim 1, wherein determining the one or more local businesses from the set of POIs that are of interest to the user comprises:
   assigning, by the one or more processors, a popularity score to each local business within the geographic area according to at least one of: a number of users who visit the local business, a frequency in which users visit the local business, a duration in which users visit the local business, or reviews of the local business; and
   identifying, by the one or more processors, the one or more of the local businesses having a popularity score above a threshold score.

9. The method of claim 1, wherein determining the one or more local businesses from the set of POIs that are of interest to the user comprises:
   for each POI in the set of POIs, determining, by the one or more processors, whether the POI is a local business based upon at least one of: obtaining an indication of a number of locations for a business associated with the POI, obtaining indications of each of the locations for the business associated with the POI and identifying an area which encompasses each of the locations, obtaining an indication of a number of employees of the business associated with the POI, obtaining reviews of the business associated with the POI and analyzing content included in the reviews, or obtaining an indication of an amount of revenue for the business associated with the POI.

10. A computing device for providing local business-based recommendations, the computing device comprising:
    one or more processors; and
    a memory coupled to the one or more processors, the memory storing instructions that, when executed by the one or more processors, cause the one or more processors to:
       identify a set of points of interest (POIs) within a digital map of a geographic area received from a user;
       determine one or more local businesses from the set of POIs that are of interest to the user, each local business of the one or more local businesses having less than a threshold number of retail locations or each local business of the one or more local businesses being within a threshold geographic range; and
       provide indications of the one or more local businesses from the set of POIs in the digital map of the geographic area to the user.

11. The computing device of claim 10, wherein the instructions that cause the one or more processors to determine the one or more local businesses from the set of POIs that are of interest to the user further comprise instructions that cause the one or more processors to:
    identify a set of search results corresponding to a search query of the geographic area, the set of search results including the set of POIs within the geographic area;
    identify a subset of the set of search results corresponding to the one or more local businesses; and
    provide indications of the subset of the set of search results in the digital map of the geographic area to the user.

12. The computing device of claim 11, further comprising instructions that cause the one or more processors to:

rank the set of search results according to relevance to the search query;
boost rankings of the subset of the set of search results corresponding to the one or more local businesses; and
provide an indication of the rankings, as boosted, to a client device for display along with the digital map of the geographic area.

13. The computing device of claim 10, further comprising instructions that cause the one or more processors to:
identify user profile data of the user; and
determine that the geographic area is unfamiliar to the user based upon the user profile data.

14. The computing device of claim 13, wherein the instructions that cause the one or more processors to determine that the geographic area is unfamiliar to the user based upon the user profile data further comprise instructions that cause the one or more processors to:
assign a familiarity score to the geographic area based upon a frequency in which the user has visited the geographic area and frequencies in which the user has visited other geographic areas; and
determine that the geographic area is unfamiliar to the user in response to determining that the familiarity score is below a threshold score.

15. The computing device of claim 13, wherein the instructions that cause the one or more processors to determine the one or more local businesses from the set of POIs that are of interest to the user further comprise instructions that cause the one or more processors to:
identify one or more recommended types of businesses for the user; and
identify the one or more local businesses by matching to the one or more recommended types of businesses.

16. A non-transitory computer-readable memory storing instructions for providing local business-related recommendations, the instructions, when executed by one or more processors of a computing device, cause the computing device to:
identify a set of points of interest (POIs) within a digital map of a geographic area received from a user;
determine one or more local businesses from the set of POIs that are of interest to the user, each local business of the one or more local businesses having less than a threshold number of retail locations or each local business of the one or more local businesses being within a threshold geographic range; and
provide indications of the one or more local businesses from the set of POIs in the digital map of the geographic area to the user.

17. The non-transitory computer-readable memory of claim 16, wherein, the instructions that cause the computing device to determine the one or more local businesses from the set of POIs that are of interest to the user further cause the computing device to:
identify a set of search results corresponding to a search query of the geographic area, the set of search results including the set of POIs within the geographic area;
identify a subset of the set of search results corresponding to the one or more local businesses; and
provide indications of the subset of the set of search results in the digital map of the geographic area to the user.

18. The non-transitory computer-readable memory of claim 17, further comprising instructions that cause the computing device to:
rank the set of search results according to relevance to the search query;
boost rankings of the subset of the set of search results corresponding to the one or more local businesses; and
provide an indication of the rankings, as boosted, to a client device for display along with the digital map of the geographic area.

19. The non-transitory computer-readable memory of claim 16, further comprising instructions that cause the computing device to:
identify user profile data of the user; and
determine that the geographic area is unfamiliar to the user based upon the user profile data.

20. The non-transitory computer-readable memory of claim 19, wherein, the instructions that cause the computing device to determine that the geographic area is unfamiliar to the user based upon the user profile data further cause the computing device to:
assign a familiarity score to the geographic area based upon a frequency in which the user has visited the geographic area and frequencies in which the user has visited other geographic areas; and
determine that the geographic area is unfamiliar to the user in response to determining that the familiarity score is below a threshold score.

* * * * *